Patented Aug. 25, 1942

2,293,890

UNITED STATES PATENT OFFICE 2,293,890

PROCESS FOR PROPAGATING BACTERIA

Samson R. Dutky, Moorestown, N. J., assignor to Claude R. Wickard, as Secretary of Agriculture of the United States of America, and his successors in office No Drawing. Application March 15, 1940, Serial No. 324,096

3 Claims. (Cl. 195—96)

(Granted under the act of March 3, 1883, as amended April 30, 1928; 370 O. G. 757)

This application is made under the act of March 3, 1883, as amended by the act of April 30, 1928, and the invention herein described and claimed, if patented, may be manufactured and used by or for the Government of the United States of America for governmental purposes without the payment to me of any royalty thereon.

My invention relates to a method for culturing or propagating certain micro-organisms which attack the larval stages of various members of the family Scarabaeidae, order Coleoptera.

The larval stages of insects of the group consisting of various members of the family Scarabaeidae, order Coleoptera are attacked by certain micro-organisms. For example, there are two species of bacteria which produce a condition known as milky disease in the larval stages of insects such as Popillia japonica, Ochrosidia borealis, Strigoderma arboricola, Strigodermella pygmaea, Autoserica castanea, and Phyllophaga spp. These two species of bacteria which are the causative agents of milky disease in the insects cited I have named Bacillus popilliae n. sp. family Bacillaceae and Bacillus lentimorbus n. sp. family Bacillaceae respectively. These bacilli are also known as "Type A milky disease organism" and "Type B milky disease organism" in the order just given.

The symptoms of milky disease in both types of the disease, namely, type A and type B, are not immediately apparent to the inexperienced eye. However, even in the early stages of the disease, affected grubs show a turbidity of the blood which obscures the dorsal blood vessel. As the disease progresses, the grubs become milky white in appearance, this coloration being easily distinguished from that of the normal fat layer. When blood from a diseased larva is observed under the microscope, it is found to be swarming with either Bacillus popilliae or Bacillus lentimorbus (Dutky, S. R. Two new spore-forming bacteria causing milky diseases of Japanese beetle larvae. Jour. Agr. Research 61, (1): 57-68. 1940. Key No. K-307). These organisms reach the blood stream by being ingested along with the soil normally taken up in the feeding process of the larvae.

I have discovered a method whereby bacteria which attack the larval stages of the Scarabaeidae may be cultured or propagated in large numbers. I will now describe a method whereby Bacillus popilliae and Bacillus lentimorbus may be cultured or propagated. However, I do not wish to limit myself to these organisms alone as I have cultivated several other insect pathogens by this method.

In carrying out the first phase of my invention which has for its purpose the preparation and preservation of stock cultures, I select a larva in the advanced stages of milky disease. I wash the larva with a suitable antiseptic solution, such as, for example, 0.5% aqueous sodium hypochlorite, remove the solution with a clean cloth, and puncture the insect in the thoracic segments, taking care to avoid puncture of the intestine. The blood containing the disease organisms is then squeezed out of the larva onto a sterile glass microscope slide by exerting pressure on the abdominal segments by means of my thumb and forefinger. I then place a second sterile slide over the drop of blood and press the two slides together firmly causing the blood to form a uniform film between the slides. The slides are then separated by slipping them apart leaving a film of blood on one face of each of the two slides. The films are then dried, preferably in a current of warm air. In these dried films, I have found that the disease organism remain viable and virulent for at least four years.

In carrying out the second phase of my invention, I use the dried blood films containing the spores of the disease organisms as stock for the preparation of inocula. This is done by removing spores from the dried blood films by moistening the films with sterile distilled water with the aid of a sterile pipette. This is facilitated by stroking the moistened film with the side of the pipette so as to bring the spore material into suspension; then holding the tip of the pipette against one corner of the slide, and tilting the slide toward the pipette tip, the suspension is run into the inclined pipette. The suspension in the pipette is then run into a sterile test tube, and fresh distilled water is flooded over the slide. By the same procedure the second portion is removed from the slide and run into the test tube. Spore counts on the suspension in the test tube are made with a counting chamber and the number of spores adjusted to approximately 300 million per cc.

This suspension is then drawn into a hypodermic syringe which is part of a microinjector capable of delivering dosages of the order of 0.003 cc. Care is taken to exclude all air bubbles which would interfere with the operation of the syringe. The loaded syringe is then mounted in the microinjector.

The microinjector and the syringe containing the spore suspension is then used to inoculate larvae of the above-mentioned insects in the following manner: The grub is held firmly and lightly between thumb and forefinger, posterior dorsal portion outward, and guided toward the needle point. The grub is forced onto the needle point so that the needle enters in the dorsal portion of the suture between the second and third posterior abdominal segments. Care must be taken that the needle enter horizontally, so as not to puncture the intestine. Care must also be taken that as far as possible the site of puncture be free from adhering soil particles. The larvae is then allowed to hang suspended on the needle during injection. The plunger of the syringe is then driven forward so that the inoculating dosage is forced into the body cavity of the grub. I have used as inoculating dosages from 10,000 spores to 3,000,000 spores per grub and an inoculating volume from less than 0.001 cc. to 0.08 cc. per grub. In large-scale propagation, a dosage of .003 cc. and 1 million to 2 million spores per grub were employed successfully.

The inoculated larvae are then incubated at temperatures less than 36° C. and higher than 16° C. until several billion spores are present in the blood of the larvae. The length of the incubation period required will depend on the inoculating volume and dosage, the species of bacteria, i. e., *B. popilliae* or *B. lentimorbus*, and the temperature of the incubation. With *B. popilliae*, using an inoculating volume of 0.003 cc., a dosage of 1 million to 2 million spores, and an incubation temperature of 30° C., a yield of 3 billion spores per larva was obtained by holding the injected larvae for 10 to 12 days' incubation.

My invention consists then in a process for the propagation of certain bacteria by injecting living insect larvae with the bacteria and holding the living injected insects at a temperature which is suitable for the development of the bacteria until the blood of the living insect larvae is swarming with the (resistant stages of the) bacteria.

Although I have described a specific method of procedure, my invention is not limited to the details set forth nor to the two species of bacteria. I have described the procedure for cultivating *B. popilliae* and *B. lentimorbus*. However, the same procedure may be used for other entomogenous bacilli, viruses, fungi or protozoa.

Having thus described my invention, what I claim for Letters Patent is:

1. The method of culturing or propagating bacteria of the group consisting of *Bacillus popilliae* and *Bacillus lentimorbus*, which comprises injecting larvae of insects of the group consisting of members of the family Scarabaeidae, order Coleoptera, with bacteria of the group consisting of *Bacillus popilliae* and *Bacillus lentimorbus* and holding the injected larvae at a temperature of substantially 30° C. for from 10–12 days.

2. The method of culturing or propagating *Bacillus popilliae*, which comprises injecting larvae of insects of the group consisting of members of the family Scarabaeidae, order Coleoptera, with *Bacillus popilliae* and holding the injected larvae at a temperature above 16° C. and below 36° C. for periods from 4 days to one month.

3. The method of culturing or propagating *Bacillus lentimorbus*, which comprises injecting larvae of insects of the group consisting of members of the family Scarabaeidae, order Coleoptera, with *Bacillus lentimorbus* and holding the injected larvae at a temperature above 16° C. and below 36° C. for periods from 4 days to one month.

SAMSON R. DUTKY.